Patented Oct. 8, 1929

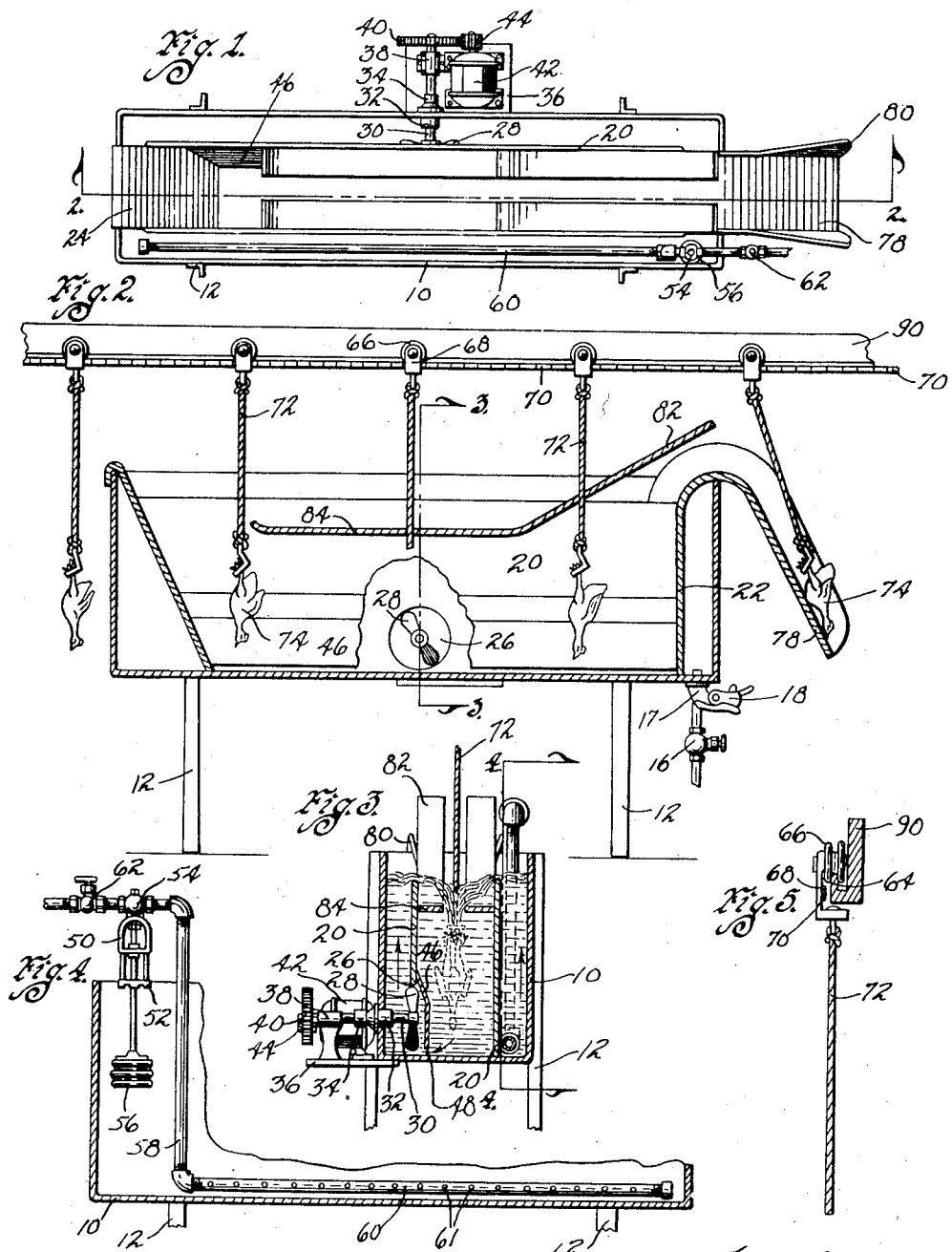

1,730,964

UNITED STATES PATENT OFFICE

SETH S. BARKER AND ALBERT W. BRUCE, OF OTTUMWA, IOWA

METHOD OF SEMISCALDING FOWLS

Application filed September 24, 1928. Serial No. 308,093.

The object of our invention is to provide a simple and efficient method for semi-scalding fowls.

More particularly, it is our object to provide such a method wherein fowls are semi-scalded by subjecting them to the action of a current of properly heated water directed against the fowls in such manner as to properly penetrate through and around all of the feathers to the skin, preferably by passing the fowls hanging head downwardly through a body of water in which there is created a current so that the water passes downwardly over and round the fowls.

Our invention may be practiced in various ways. One apparatus by which it may be satisfactorily carried out is illustrated in our Patent, No. 1,672,555, issued June 5, 1928.

The method, however, can be practiced with other kinds of apparatus, and it is our present purpose to cover the method per se whether practiced with the apparatus of our patent above mentioned or with other mechanical devices.

With these and other objects, our invention consists in the practice of the method herein described, and for purposes of illustration, we have shown an apparatus similar to that of our prior patent illustrated in the accompanying drawings, in which:

Figure 1 is a plan view of our semi-scalding tank structure.

Figure 2 is a longitudinal sectional view thereof taken on the line 2—2 of Figure 1.

Figure 3 is a transverse, sectional view taken on the line 3—3 of Figure 2.

Figure 4 is a longitudinal, sectional view taken on the line 4—4 of Figure 3 illustrating one means for maintaining the water in the tank at a predetermined temperature; and Figure 5 is an enlarged, detail sectional view taken on the line 5—5 of Figure 2 illustrating the means for quickly withdrawing a fowl from the tank.

In the poultry industry there are three methods of preparing fowls to be picked.

First is the scald method whereby boiling water is used into which the fowls are dipped a predetermined length of time. This method brings the fowl to a good condition for picking but it has drawbacks. The main drawback is that the boiling water tends to partially cook the skin of the fowl so that after they are picked they do not present quite as good an appearance in the show case and they are not in the best of condition for cold storage. As result of this, many fowls which might have been termed as No. 1 must be set back into a No. 2 class.

A second method is the dry pick. When this method is used, the fowls are in excellent condition for display and for eating, but the feathers are very difficult to pick from them.

A third method has been extensively used and has proven the best. This is the semi-scald method in which a tank is utilized having water in it at about 130° Fahrenheit. By the semi-scald method, the fowls can be picked quicker than by the dry pick method and there is no tendency to cook the skin of the fowl as in the scald method. However, certain disadvantages have been found in that the water does not evenly penetrate to the skin of the fowl unless they are dipped in the water and left there longer than is best to obtain satisfactory results and the fowls after having been killed tend to float on the water instead of being submerged.

To overcome the tendency for the fowls to float, weights have been used, but this involves additional expense and bother as the weights must be attached to the fowls by hand as they enter the tank and the weights must be removed after the fowls leave the tank.

It has been difficult prior to the use of our method to practice the semi-scald method with entire success because it was difficult to insure with certainty that the hot water would penetrate the feathers and around them to the skin of the fowl over all parts of the body.

Nevertheless a greater percentage of No. 1 fowls has heretofore come from the use of the semi-scald method than from any other. Such fowls look better in the show case because the semi-scald method enables the pickers to remove all the small hairs from the fowl. This is very difficult to do where the dry pick and scald methods are used.

Fowls which have been semi-scalded go through cold storage in excellent shape.

By the use of our semi-scald methods as practiced with our apparatus above mentioned, we have been able to overcome the objections found in the practice of the other methods heretofore employed.

We have carried on a great number of experiments to determine the best method for semi-scalding fowls and believe that the best results are secured when the fowls are hung head downwardly and are then subjected to the action of a current of hot water moving downwardly with relation to the fowls. The water will penetrate the feathers because it travels from the outer end of the feathers inwardly to the body and thoroughly wets all of then and heats and wets the skin around all of the feathers.

By way of illustration of the construction of one apparatus by which our method can be practiced, we have shown in the accompanying drawings a tank 10 supported on legs 12. The water is supplied to the tank through an inlet pipe 14. The flow through that pipe is controlled by the valve 16.

An outlet pipe 17 in which is a control valve 18 may be uesd for draining the tank.

In the particular form of the device here shown, we provide spaced from the side walls of the tank 10 the inner walls 20, which terminate short of the top of the tank and are connected by end walls 22 and 24 inclined from the top of the tank at its ends inwardly and downwardly to the lower parts of the walls 22 and 24. The walls 20, 22 and 24 form in the present device an inner tank which may or may not have a bottom of its own.

We provide means for causing circulation from the bottom of this inner tank upwardly around the outer sides thereof and downwardly through the inner tank as follows:

In one of the walls 20 is an opening 26. Suitably arranged with relation to that opening is a propeller blade or the like 28, which may be operated from the shaft 30 projecting through a bearing 32 in the side of the tank 10. The bearing 32 is provided with a suitable stuffing box 34.

The bracket 36 is mounted on the tank 10 and is provided with a bearing 38 for the shaft 30. The motor 42 is placed on the bracket 36 and on its shaft is a pinion 44 meshing with a pinion 40 on the shaft 30.

For insuring the even circulation of the water downwardly throughout the inner tank for its entire length, there may be provided a baffle wall inside the inner tank along the side adjacent to the opening 26 extending from a line above the opening the entire length of the inner tank and terminating near the bottom of the inner tank to leave a narrow opening 48 along that bottom.

The even distribution of the water throughout the length of the inner tank is also contributed to by horizontal guide members 84 hereinafter again referred to.

A means for automatically controlling the flow of steam through the water used and for thus automatically controlling the temperature of the water may be employed.

For instance, we call attention to the automatically regulated valve structure 50 mounted on the bracket 52 on the tank 10. This control device is connected with a valve 54 in the steam inlet pipe 58 and is actuated from a bellows-type diaphragm 56 in the tank 10. A steam distributing pipe 60 is connected with the pipe 58. It is provided with a series of holes 61. A manually controlled shut-off valve 62 may be provided in the pipe 58.

In our apparatus, we provide above the tank 10 a conveyor track 64 on which a series of pulleys 66 travel. These pulleys are journaled in brackets 68, which are all connected to a chain 70 actuated in any suitable way.

Hanging from the brackets 68 are cables or the like 72 from which the fowls 74 may be hung head downward by any suitable hook devices.

The fowls are drawn through the tank from end to end.

At the front end of the tank 10 is an intake chute 78 leading into the tank 10.

Projecting inwardly from the sides 20 near the upper ends thereof for a substantial portion of the length of the inner tank are the members 84, which at the intake end of the device are provided with the upwardly and forwardly inclined portions 82, which serve to guide the fowls downwardly and prevent their floating on the top of the water. The members 84 terminate short of the discharge end of the tank.

The members 82 and 84 serve the double function of guiding the fowls down into the water and holding them from floating and also of insuring an even downward circulation of water throughout the length of the inner tank and also of insuring that the circulation of the water will be downwardly immediately above the fowls supported on the cables 72.

For further illustrating the practice of our method by means of the particular apparatus here disclosed, it may be said that the tank 10 is filled with water to somewhere close to the top of the walls 20.

The water is then heated by steam or in any other suitable way and the heat is maintained by the automatic device mentioned or otherwise.

The motor operates the propeller 28, thereby causing a continual circulation of water downwardly through the inner tank and upwardly between the walls of the inner tank and the walls of the tank 10.

The fowls are slowly drawn through the warm water and as they travel are subjected to the action of the downwardly moving current of water which enters into and all around all of the feathers of each fowl. The submerging of the fowls is insured and the particular manner of circulating the water causes it to penetrate to the skin of each fowl over its entire body.

The maintenance of such a circulation of course further insures an even temperature throughout the body of water.

It will, of course, be understood that the temperature of the water may be varied and the length of time for which the fowls are subjected to the action of the water may be regulated according to the requirements of the different kinds of fowls, such as chickens, geese and so forth.

This method eliminates the difficulties to which other semi-scald methods have been subject and has very substantial advantages.

The principal objection to the semi-scald method has arisen from the difficulty of subjecting all of the feathers of the fowl and all of the body of the fowl to the action of the heated water. By hanging the fowls head downwardly and subjecting them to the action of the downwardly moving current of water controlled as to its direction of movement and as to the manner in which it is directed against the fowls and as to its temperature insures the thorough semi-scalding, which is desired.

The movement of the fowls lengthwise through the inner tank below the slots or openings formed between the members 84 insures the certainty of the fowls being properly semi-scalded even if there should be any unevenness in the movement of the current of water.

It will be seen that while our process is intended primarily for use in semi-scalding chickens, it could be used in connection with the hard scalding method also.

Another feature of the present method which is of small importance lies in the fact that the downwardly moving current of water keeps the heads of the fowls hanging downwardly. Some produce houses hangs a weight on the head or neck of every fowl before it is subjected to the treatment of water either in the semi-scalding or hard scalding method. If a weight is not used, it has heretofore been true, that water might get into the neck of the fowl and even to the crop in which case the flesh which has been subjected to the water it has been found, is likely to deteriorate.

When our method is used, the head is kept hanging downwardly by the movement of the water without the necessity of using weights. Furthermore, there is a continually moving current of water past the head and no water enters the neck of the fowl. This is another feature wherein our method contributes to the securing of fowls properly weighted for cold storage.

We claim as our invention:—

1. A method of semi-scalding fowls, consisting in subjecting the fowls, while submerged, to the action of a current of semi-scalding water directed against the fowls opposite to the lay of their feathers.

2. A method of semi-scalding fowls, consisting in moving the fowls through a body of water and subjecting them during such movement to the action of a current of water directed against the fowls opposite to the lay of their feathers.

3. A method of semi-scalding fowls, consisting of hanging the fowls by their legs and subjecting them while thus hung and while submerged, to the action of a current of semi-scalding water directed against the fowls opposite to the lay of their feathers, the movement of the current tending to hold the fowls submerged.

4. A method of semi-scalding fowls, consisting in drawing the fowls through a body of water and subjecting them during their movement through the water and while they are submerged therein to the action of a current of semi-scalding water directed against the fowls opposite to the lay of their feathers.

SETH S. BARKER.
ALBERT W. BRUCE.